June 26, 1962  L. J. BULLIET  3,040,607
MACHINE TOOL
Filed June 26, 1959  6 Sheets-Sheet 1

Fig. 1.

INVENTOR.
Leander Jackson Bulliet
BY Olson & Trexler
attys.

June 26, 1962 L. J. BULLIET 3,040,607
MACHINE TOOL
Filed June 26, 1959 6 Sheets-Sheet 2

INVENTOR.
Leander Jackson Bulliet
BY Olson & Trexler attys

June 26, 1962 L. J. BULLIET 3,040,607
MACHINE TOOL
Filed June 26, 1959 6 Sheets-Sheet 6

INVENTOR.
Leander Jackson Bulliet
By: Olson & Trexler

United States Patent Office 3,040,607
Patented June 26, 1962

3,040,607
MACHINE TOOL
Leander Jackson Bulliet, Rockford, Ill., assignor to W. F. and John Barnes Company, Rockford, Ill., a corporation of Illinois
Filed June 26, 1959, Ser. No. 823,241
16 Claims. (Cl. 82—14)

The present invention relates to machine tools and, more particularly, to machine tools adapted to machine surfaces of revolution by polar coordinate movements of a cutting tool relative to a rotating workpiece. Machine tools of this character are well suited for machining surfaces of revolution on certain classes of workpieces which vary progressively in diameter along the rotary axes of the workpieces. Examples of workpiece shapes which can be machined to advantage in such machines include, ellipsoids, paraboloids, hyperboloids, spherical surfaces, and various "free forms" of revolution.

One object of the invention is to provide, for machining surfaces of revolution which vary in diameter along the axes thereof, an improved machine tool which provides and maintains during the machining of a surface of the character recited a maximized machining rate that is limited only by factors extrinsic to the inherent capabilities of the improved machine itself; such, for example, as the machinability of the workpiece, the maximum cutting speed at which the required finish can be produced by the cutting tool used in the machine, and practical limits of the degree to which the rotary speed of the workpiece can be varied by means of a variable speed drive.

Another object is to provide, for machining a surface of revolution on a rotating workpiece having a progressively varying diameter along its axis of rotation, an improved machine tool which will provide a most efficient cutting speed and maintain this speed substantially constant as the machine operates to machine workpiece portions varying in diameter with respect to the rotary axis of the workpiece, while at the same time providing for preadjustment of the width of tool feed per revolution independently of the cutting speed and serving to maintain the width of tool feed per revolution constant throughout the machining of the workpiece.

Another object is to provide, for machining a surface of revolution on a workpiece which varies progressively in diameter along the axis of the surface of revolution, an improved machine tool which can be adjusted to provide the most efficient cutting speed for machining the workpiece and which provides for adjustment of the width of cut per revolution independently of the cutting speed, while at the same time serving in operation to maintain the cutting speed and the width of cut substantially constant during the machining of a workpiece of the character recited.

A further object is to provide for machining a surface of revolution on a workpiece, an improved machine tool which provides for adjustment of the cutting speed at which the surface of a rotating workpiece is moved relative to a cutting tool to provide for the most efficient machining of the workpiece consistent with its machinability and the machining requirements and which provides for adjustment of the width of cut per revolution independently of the cutting speed, while providing for automatic modulation of two independent variable speed drives for rotating the workpiece and for feeding the tool in accordance with the position of the tool relative to the workpiece to maintain the preadjusted cutting speed and the preadjusted width of feed substantially constant as the machine operates to machine a surface of revolution on a workpiece which varies progressively in diameter along the axis of the surface being machined.

A further object of the invention is to provide an improved machine tool as set forth in the foregoing objects which is adapted to provide and maintain an optimum cutting speed and a substantially unvaried width of feed in the machining of rotary surfaces of revolution on workpieces of radically different shape.

A further object is to provide for machining a surface of revolution on a workpiece which varies in diameter along the axis of the surface, an improved machine tool in which two separate, variable speed drives employed to rotate a workpiece and to feed a cutting tool in relation to the workpiece are coordinated and independently modulated in accordance with the instantaneous position of a cutting tool relative to the workpiece in the machine to the end that mechanical complication of the machine is obviated while at the same time providing for maintaining a uniform cutting speed and a uniform width of tool feed per revolution of the workpiece as machining progresses along successive portions of the workpiece varying in diameter relative to the axis of the surface of revolution being machined.

Other objects and advantages will become apparent from the following description of the exemplary form of the invention illustrated in the drawings, in which.

Figure 1:
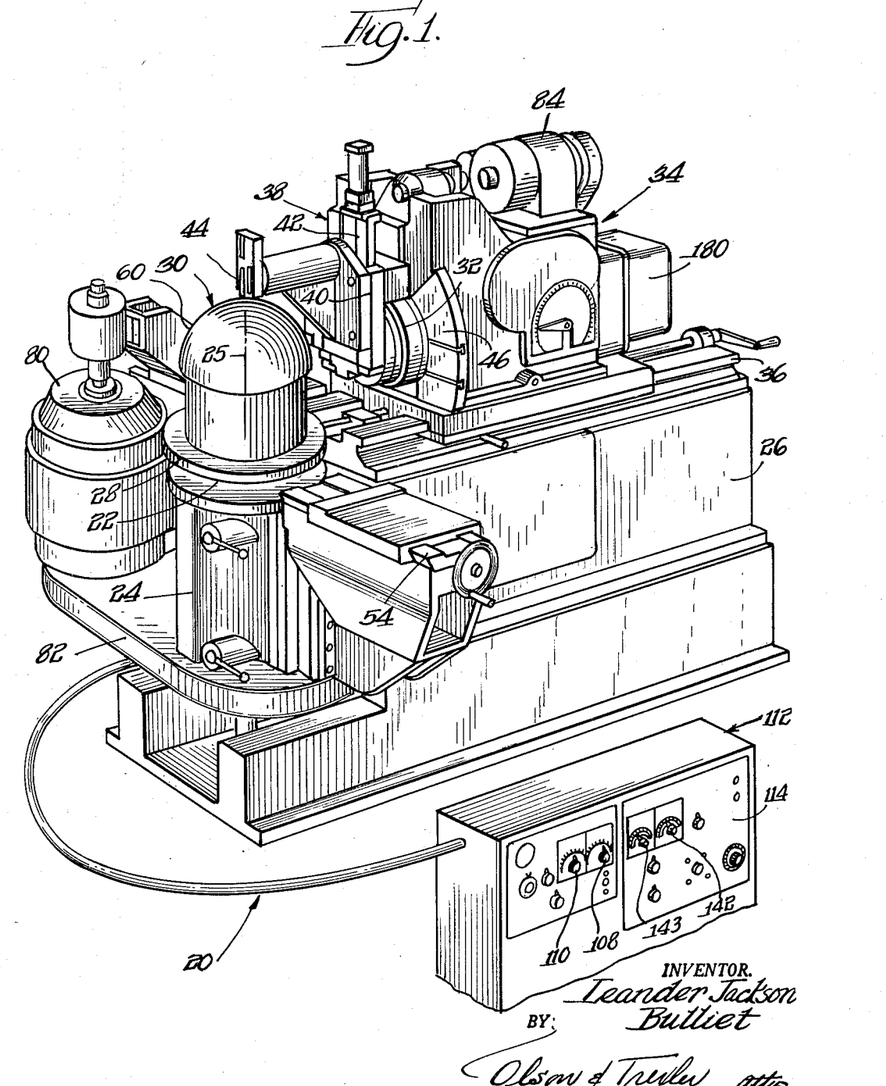
FIGURE 1 is a perspective view of a machine tool embodying the invention.
Figure 2:
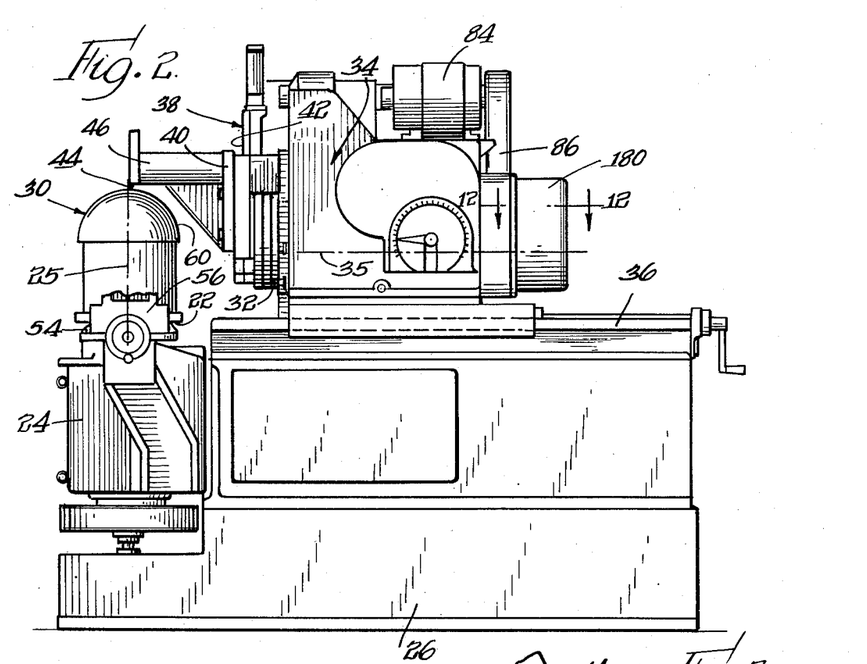
FIG. 2 is a side view of the machine tool of FIG. 1.

Referring to the drawings in greater detail, the machine tool 20 illustrated in FIG. 1 and forming the exemplary embodiment of the invention is adapted to machine a surface of revolution on a workpiece by polar coordinate movements of a cutting tool relative to the workpiece while the workpiece is rotated about an axis coincident with the axis of the surface being machined. Thus, as shown in FIGS. 1 and 2, the machine comprises a rotary work support spindle 22 mounted in a vertically adjustable spindle head 24 for rotation about a vertical axis 25. The work spindle head 24 is mounted on one end of an elongated bed 26. The upper end of the spindle 22 carries a suitable fixture or work holder 28 adapted to support a workpiece 30 for rotation by the spindle.

A tool support spindle 42 (only one end of which appears in FIGS. 1 and 2) is mounted in a tool spindle head 34 for controlled rotation about a horizontal axis 35, which, of course, is perpendicular to the work spindle axis 25. The tool spindle head 34 is mounted for horizontal translation toward and away from the work spindle 22 on support ways 36 surmounting the bed 26.

A tool support arm 38 fixed to the work spindle end of the tool spindle 32 and projecting radially away from the tool spindle, as shown, provides support to a tool support slide 40 which is translatable toward and away from the axis 35 of the tool spindle along ways 42 on the support arm 38.

A cutting tool 44 selected for the particular machining operation to be performed is mounted on the projecting end of a tool mount 46 cantilevering from the slide 40 toward the work spindle, as shown.

The radial position of the cutting tool 44 with respect to the axis of the tool spindle 32 is determined by the position of the slide 40 along the arm 38. In some instances, as when a spherical surface is to be machined, the position of the cutting tool 44 is fixed relative to the axis 35 of the tool spindle by clamping or otherwise fixing the slide 40 on the arm 38. To machine surfaces of revolution of a more complex form, it is necessary to vary the radial position of the tool 44 by moving the slide 40 along the arm 38 as the tool is rotated about the tool spindle axis 35.

Figures 3, 4:
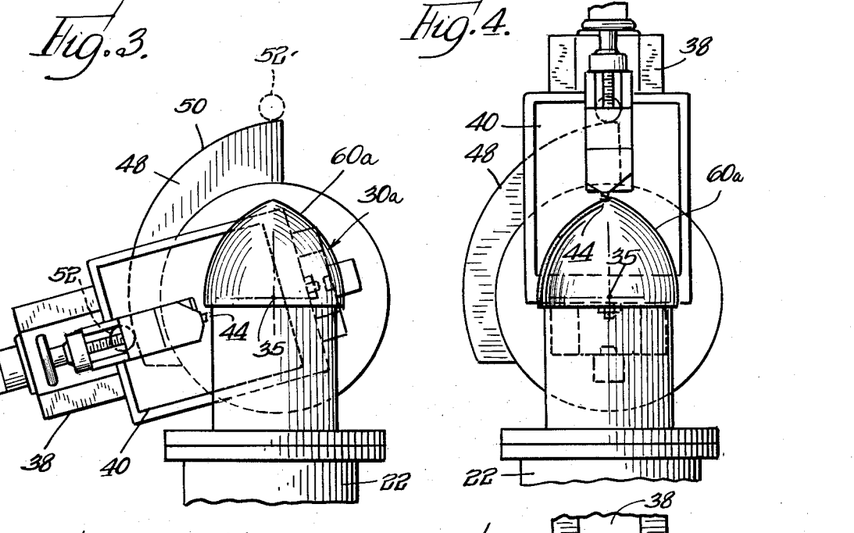
FIG. 3 is a fragmentary and somewhat simplified front elevational view illustrating operation of the machine tool at the beginning of the machining of an external surface of revolution.
FIG. 4 is a view similar to FIG. 3 illustrating the terminal phase of the machining of an external surface of revolution.

The radial position of the cutting tool 44 can be conveniently controlled in relation to the angular position of the tool around the axis 35 of the tool spindle by means of a template mounted on a template support 46 provided on the work spindle end of the tool spindle slide 34. A tool slide control template 48 used for this purpose is shown in the somewhat simplified elevational views of the tool support and work spindle structure appearing in FIGS. 3 and 4. Thus, as shown in FIGS. 3 and 4, a typical control template 48 defines an arcuate cam surface 50 extending through an angle of at least 90 degrees for engagement by a cam follower 52 on the tool support slide 40, which is continuously urged radially inward toward the axis 35 of the tool spindle. As will presently appear, the shape of the cam surface 50 is determined by the shape of the surface of revolution to be machined.

The general construction of the machine tool 20 as described thus far is illustrative of the basic organization of machine tools designed to machine a surface of revolution on a rotating workpiece by polar coordinate movement of a cutting tool relative to the workpiece. The specific design of the machine tool is determined by the machine tool designer in accordance with the service in which the machine tool is to be used. The exemplary machine tool 20 illustrated is provided with auxiliary support ways 54, FIGS. 1 and 2, secured to the frame and positioned to extend laterally from the work spindle head 24 for supporting a translatable tool support slide 56, FIG. 2, which may be used to machine surfaces on a work piece by an auxiliary cutting tool (not shown) carried by the slide 56.

As shown in FIGS. 1 and 2, the machine tool 20 is set up to turn a hemispherical surface 60 on the work piece 30. For this purpose, the machine 20 is adjusted so that the mutually perpendicular axes 25, 35 of the work spindle 22 and tool spindle 32 intersect each other at the center of curvature of the surface 60 to be machined. The slide 40 is adjusted and fixed on the arm 38 to provide a radial spacing between the tool 44 and the tool spindle axis 35 conforming to the radius of curvature of the hemispherical surface to be generated. If successive cuts are to be made, the slide 40 is adjusted inwardly between successive cuts.

FIGURES 3 and 4 illustrate operation of the machine to machine on a workpiece 30a an external surface of revolution 60a which deviates from a hemispherical surface in that the surface 60a is crowned or elongated along the rotary axis of the workpiece as shown. To generate this particular surface 60a, the control template 48, previously mentioned, is shaped to progressively increase the spacing of the cutting tool 44 from the tool spindle axis 35 as the tool is progressed by rotation of the tool spindle 32 from the starting position shown in FIG. 3 to the position shown in FIG. 4, in which machining of the surface 60a is completed.

Figure 5:
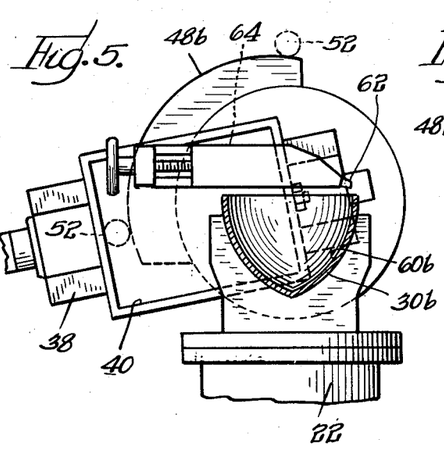
FIG. 5 is a view similar to FIG. 3 illustrating the machine set up to start the machining of an internal surface of revolution.
Figure 6:
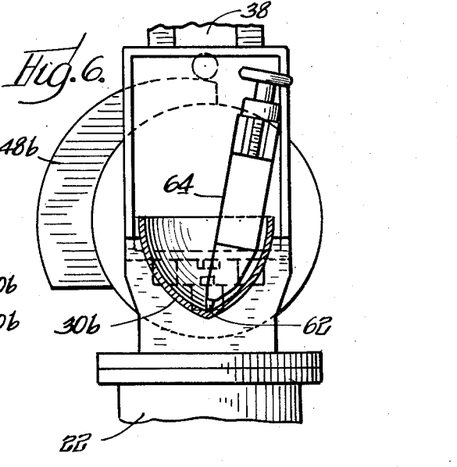
FIG. 6 is a view similar to FIG. 5, but showing the position of the parts at the completion of the machining of an internal surface of revolution.

FIGURES 5 and 6 illustrate operation of the machine tool to machine an internal surface of revolution 60b on a workpiece 30b mounted on the work spindle 22. Here, a cutting tool 62 is mounted on the tool slide 40 by means of a fixture 64 which swings the tool 62 down into the workpiece from the position shown in FIG. 5 to the position shown in FIG. 6 as the tool support arm 38 is rotated by the tool spindle. Here the radial position of the tool 62 is controlled by a template 48b, engaged by the tool slide follower 52.

The means used to control the polar coordinate movement of the cutting tool; i.e., its angular movement by the tool spindle 32 and its radial movement by the slide 40; can be adapted by those skilled in the art to produce surfaces of revolution of the shape and character desired in specific instances.

In accordance with the present invention the exemplary machine tool 20 is powered and controlled in a new and improved manner which enables the machine to remove stock material from workpieces at most efficient machining rates which are maintained substantially constant throughout the major portions of machining operations which generate surfaces of revolution of the character previously referred to, the machining rates thus provided and maintained being limited for the most part only by the machinability of the workpieces and the character of the surfaces which must be produced.

Figure 7:
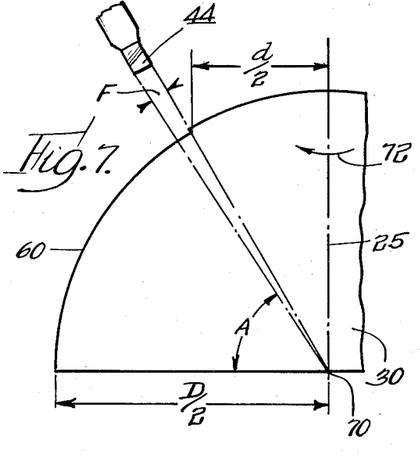
FIG. 7 is a diagrammatic illustration showing a cutting tool and a workpiece on which a hemispherical surface of revolution is being machined and depicting the trigonometric relationships of the cutting tool relative to the workpiece.
Figure 7A:
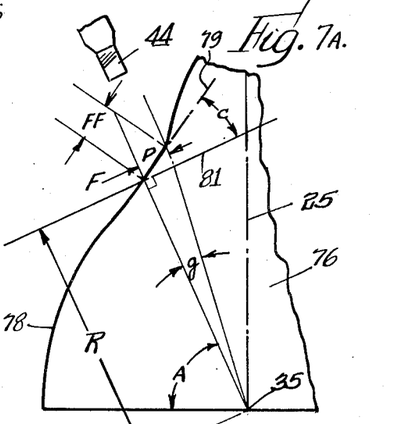
FIG. 7A is a view similar to FIG. 7 but illustrating the machining of an irregular surface of revolution.

The problems involved in maintaining a most efficient machining rate during the machining of a surface of revolution by polar coordinate feeding movements of a cutting tool in relation to a workpiece in the manner described can be visualized to advantage by reference to FIGS. 7 and 7A.

FIGURE 7 depicts the workpiece 30 on which the hemispherical surface 60 is generated by operation of the machine tool 20. For clearness in illustration with reference to the present explanation, the cutting tool 44 is shown displaced away from the surface 60 in a radially outward direction with reference to the center 70 of curvature of the surface 60. In the machine tool 20 the work piece 30 is rotated, as indicated by the arrow 72 in FIG. 7, about an axis of rotation which coincides with the axis 25 of the work spindle 22 and which is designated by the same reference numeral in this figure.

The rate at which stock is removed in the machining of the workpiece 30 is a function of the width and depth of cut of the tool 44 and the cutting speed. The term "cutting speed" is used to denote the speed at which the surface of the workpiece in instantaneous engagement with the cutting tool is moved relative to the tool. The depth of the cut made by the tool 44 is determined by the radial adjustment of the tool support slide 40 and, except for possible variations caused by initial roughness of the workpiece, is readily maintained in the manner described at a constant value throughout the machining of a surface of revolution.

However, the matter of controlling the cutting speed and the width of the cut made per revolution involves the relationship of geometric factors which vary progressively during the machining of a surface of revolution and which tend to modify both the cutting rate and the width of cut in accordance with nonlinear functions of changing positions of the cutting tool relative to the workpiece.

Thus, the cutting speed of the tool 44 relative to the portion of the workpiece surface 60 in instantaneous engagement with the tool is a function not only of the rotary speed of the work spindle 22 but also the instantaneous radial spacing of the tool 44 from the rotary axis 25 of the workpiece.

The instantaneous radial spacing of the cutting tool 44 from the workpiece axis 25 is indicated in FIG. 7 as "$d/2$." The instantaneous cutting speed, which we may denote by the letter "S," has a value determined in accordance with the following formula:

$$S = pi\ da$$

In the above formula, "pi" is the ratio of the circumference to the diameter of a circle and "$a$" is the rotary speed of the work spindle 22 in revolutions per unit of time.

Looking again to FIG. 7, it will be noted that the radius of the workpiece 30 at its base is denoted by "$D/2$." The rotary angle through which the tool 44 is displaced from its starting position at the base of the workpiece to reach its instantaneous position in a machining operation is denoted by the letter "A." The trigonometric relationship of the diameters "$d$" and "$D$" and the angle "A" are expressed by the following formula:

$$d = D \cos A$$

From the above expressions it can be determined that the rotary speed "$a$" of the workpiece is related to the cutting speed "S" and the angle "A" in accordance with the following formula:

$$a = \frac{S \sec A}{pi\ D}$$

It will appear from the preceding formula that in order to maintain a constant cutting speed "S" the rotary speed "$a$" of the work spindle 22 must vary as does the secant of the angular displacement "A" of the cutting tool 44 from its starting position. As will presently appear, the present invention provides in the machine tool an extremely efficient and highly practical control means which maintains a constant cutting speed of the cutting tool during the machining of a surface of revolution of the character described while at the same time obviating complications in the mechanical construction of the machine tool.

The improved control means provided for this purpose also, and this is most significant, maintains a uniform width of cut of the cutting tool which together with the uniform cutting speed maintains the desired highly efficient rate of stock removal by the machine, all this being accomplished without significantly complicating the mechanical construction of the machine tool.

Referring again to FIG. 7, the width of cut made per revolution of the workpiece 30 is designated by the letter "F." The width of cut "F" is related to the rotary speed of the work spindle 22 and to the rotary speed of the tool spindle 32 in accordance with the following formula:

$$h\ pi\ D = Fa$$

In the above formula "$b$" denotes the speed of the tool spindle 32 in revolutions per time unit, and "$a$" denotes the speed of the work spindle 22 in similar units. By making substitutions in the preceding formula from previous formulas the speed "$b$" of the tool spindle can be determined in accordance with the following formula:

$$b = \frac{FS \sec A}{(pi\ D)^2}$$

The preceding formula reveals that if the cutting speed "S" and the width of cut "F" are to remain uniform as machining progresses, the speed "$b$" of the work spindle must vary as the secant of the angle A, a nonlinear trigonometric function.

Moreover, the above formulas for determining the speeds of the work spindle and cutting spindle necessary for maintaining a uniform rate of stock removal are strictly applicable only to the turning of hemispherical surfaces. To maintain a uniform rate of stock removal while machining a surface of revolution which deviates substantially from a hemispherical surface, it is necessary to take into account the geometric factors relating to the specific shape of the surface being machined.

The additional factors relevant to controlling the machine for machining a surface of revolution deviating from a hemispherical surface may be visualized with reference to FIG. 7A, which depicts a workpiece 76 having an irregular external surface of revolution 78. For purposes of discussion it may be assumed that the cutting tool 44 has reached the position "P" along the surface 78. The small angle designated by the letter "$g$" represents the angular degree to which the cutting tool 44 is advanced by angular movement of the tool support arm during each rotation of the workpiece. If the surface being machined were a hemispherical surface, this angular movement "$g$" of the tool would advance the tool along the surface of the workpiece to have a width of cut indicated by the letter "F" in FIG. 7A. However, the surface 78 at the point "P" deviates as shown from a hemispherical surface to a degree indicated by the angle "$c$" between a tangent 79 to the surface of revolution 78 and a line 81 representing a tangent to a hemispherical surface of revolution (not shown) passing through the point "P." Consequently, feeding movement of the cutting tool 44 by rotary movement of the support arm 38 through the angle "$g$" causes the cutting tool to have a width of cut along the surface 78, indicated by the letters "FF," which exceeds the width of cut "F" which would be produced if the surface were a true hemisphere. The two widths "FF" and "F" are related to each other in accordance with the following formula:

$$FF = F \sec c$$

Hence, to maintain the actual width of cut "FF" constant during the machining of a surface of revolution deviating from a hemisphere, it is necessary to take into account the specific shape of the surface of revolution being machined.

Moreover, it will appear from an inspection of FIG. 7A that the radial spacing, indicated in this figure by the letter "R," of the cutting tool 44 from the tool spindle axis 35 does vary in the machining of a surface of revolution other than a hemisphere. Changes in this radius "R" cause corresponding changes in the radial spacing of the cutting tool from the axis of revolution 25 of the work piece to produce corresponding variations in the cutting speed and also variations in the width of tool feed "FF" for any given angle "$a$" of tool feeding movement. Hence, in order to maintain a constant cutting rate it is necessary in machining a surface of revolution deviating from a hemisphere to take into account the degree to which the surface being machined deviates from a hemispherical surface.

As will presently appear, the machine tool 20 is controlled in accordance with the present invention in a manner which maintains a uniform cutting speed and a uniform width of cut during machining surfaces of revolution deviating from hemispherical surfaces while at the same time providing for preadjustment of the cutting speed for the most efficient machining of a given workpiece and providing for infinite preadjustment of the width of cut independently of the cutting speed used.

For this purpose, the work spindle 22 and the tool spindle 32 are independently driven through two continuously variable speed drives mechanically independent of each other and connected to drive the respective work and tool spindles in a manner which coordinates the speeds of the two spindles while at the same time providing for continuous and infinite adjustment of the speed of either spindle independently of the speed of the other spindle.

Thus, as shown in FIG. 1, a variable speed electric motor 80 is connected through a suitable transmission 82 to drive the work spindle 22. Another variable speed electric motor 84 is mounted on the tool spindle slide 34 as shown in FIGS. 1 and 2 and connected to drive the tool spindle 32 through a transmission 86 which includes, as will presently appear, suitable change-speed gears (not shown) housed in the slide 34. Change-speed gears suitable for use in the transmission 86 can be readily provided by those skilled in this art and need not be specifically illustrated and described here.

The speeds of the two independent spindle driving motors 80 and 84 are controlled in accordance with the present invention by control structure which continuously solves the trigometric equations determining the work spindle and tool spindle speeds necessary for maintaining a constant machining rate while at the same time providing continuous compensation as necessary to take into account deviation from a hemispherical surface of the actual shape of the surface of revolution being machined. The control structure provided by the invention for this purpose is illustrated diagrammatically in FIG. 8.

Figure 8:
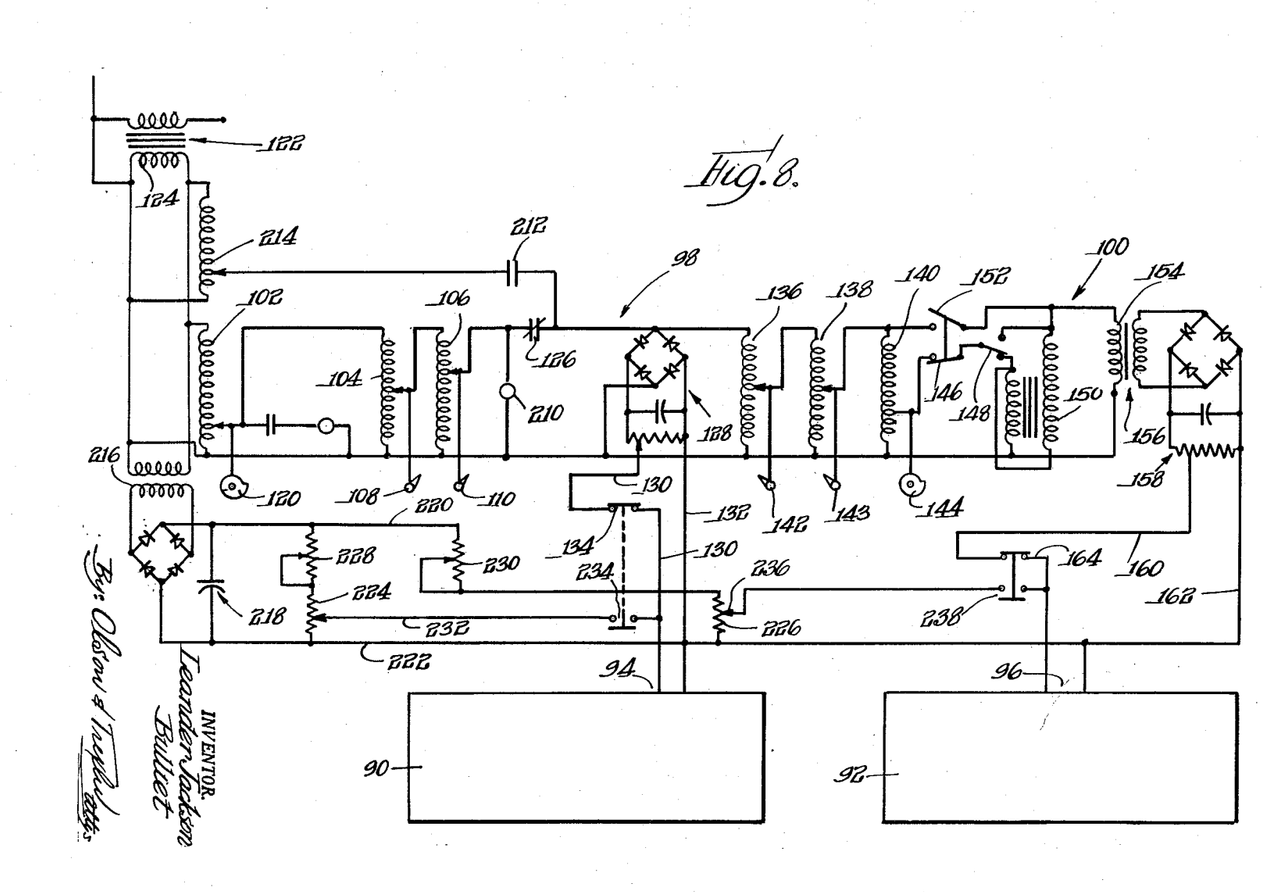
FIG. 8 is a diagrammatic layout of the control system used to control the improved machine tool in accordance with the invention.

The variable speed work spindle drive motor 80 and the variable speed tool spindle drive motor 84 are controlled independently of each other by two separate motor speed control units 90, 92, illustrated diagrammatically in FIG. 8. Each of the motor control units 90, 92 controls the instantaneous speed of its associated motor in accordance with the instantaneous value of electrical control signals supplied to the inputs 94, 96 of the respective controls, as will presently appear. In this instance the controls 90, 92 respond to control voltages supplied to the inputs 94, 96. The two motor controls 90, 92, as such, are of a well known construction and are commercially available from manufacturers of electrical control equipment.

For convenience in discussion, the control system illustrated diagrammatically in FIG. 8 may be regarded as comprising, in addition to manual controls to be described presently, two interrelated electrical control circuits designated generally by the numbers 98 and 100. In general, the control circuit 98 supplies an electrical control voltage to the input 94 of the work spindle drive control 90 and the control circuit 100 supplies a control voltage to the input 96 of the work spindle drive control 92.

Each of the two control circuits 98, 100 is modulated by a mechanical feedback from the tool spindle 32 integrated into the control circuits in a manner which provides for the continuous solution of the nonlinear functions involved in determining the desired control of the work spindle and tool spindle speeds.

As previously explained, the work spindle speed required to maintain a constant machining rate is a function of three factors; i.e., the cutting speed "S," a diametrical dimension "D" of the work piece, and a trigonometric function of the instantaneous angular position of the cutting tool 44 with respect to the work spindle axis 25. As explained, the last-mentioned factor becomes even more complex when the surface being machined deviates from a hemispherical surface. The circuit 98 operates to control the speed of the work spindle 22 in accordance with all of the above factors.

For this purpose, three adjustable electrical components 102, 104, and 106, each of which has a variable effective value determined by the instantaneous adjustment of the component, are incorporated into the circuit 98 in a manner such that adjustment of these components varies the effective value of the output of the circuit 98 which is connected to the work spindle motor control 90.

Preferably, the three adjustable components 102, 104, 106 are formed by adjustable auto transformers connected in cascade as will be presently described in greater detail. Adjustable auto transformers suitable for this purpose are commercially available, one such transformer suitable for this purpose being sold under the trade name "Variac." The transformers are individually adjustable by mechanical controls provided for this purpose.

Having reference to FIG. 8, it will be noted that the transformer 104 having its input connected to the output of the transformer 102 is adjusted by means of a manual control 108, which provides for presetting the transformer 104 in accordance with the desired cutting speed "S" for a particular machining operation. The transformer 106 has its input connected to the output of the transformer 104 and is adjusted by a manual control 110 in accordance with a transverse dimension "D" of the workpiece to be machined.

Figure 9:
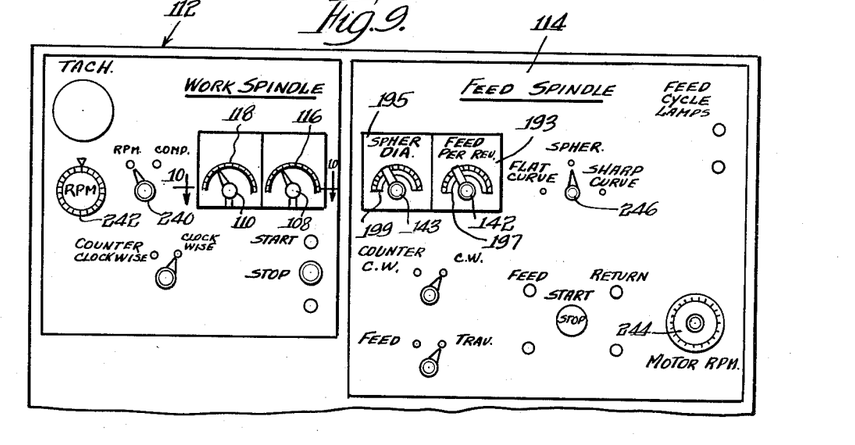
FIG. 9 is an elevational view of the instrument panel on the control console for the machine.

The two transformers 104 and 106, together with the major portion of the components of the circuits 98 and 100, are physically mounted in a control console 112 illustrated in FIGS. 1 and 9. The two manual controls 108 and 110 for the transformers 104, 106 are mounted on the instrument panel 114 of the control console 112, as illustrated in FIG. 9. Graduated scales 116, 118 associated with the controls 108 and 110 facilitate proper setting of these controls.

Figure 12:
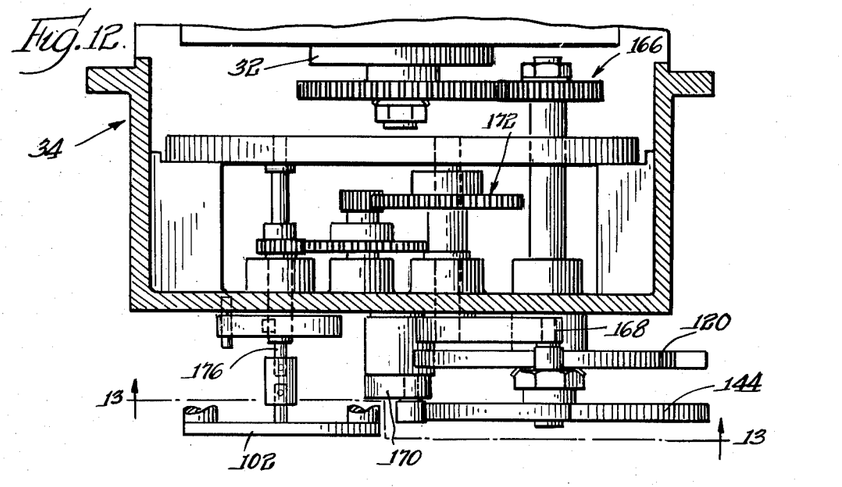
FIG. 12 is an enlarged sectional view taken generally along the line 12—12 of FIG. 2 and illustrating mechanical feed-back mechanisms connecting the tool spindle to electrical control structure for the machine.
Figure 13:
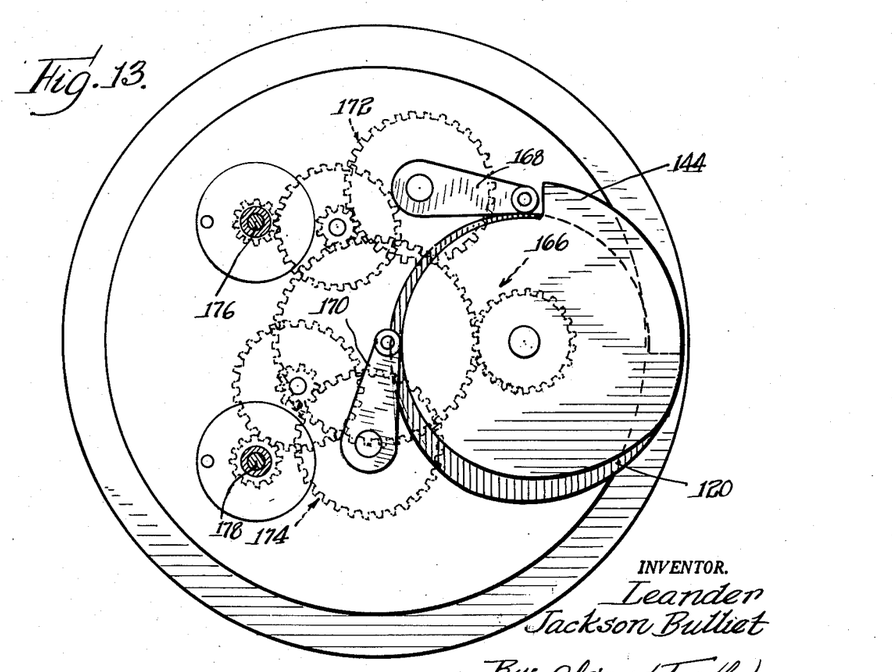
FIG. 13 is an end elevational view of the mechanical feed-back mechanisms taken with reference to the line 13—13 of FIG. 12.

The transformer 102, which has its output connected to the input of the transformer 104, is continuously adjusted during the machining of a workpiece by a control cam 120, FIGS. 8, 12, and 13, operated by a mechanical feedback from the work spindle 32 and having a shape which effects through adjustment of the transformer 102 the desired modulation of the work spindle speed in accordance with the angular position of the tool spindle.

A control cam 120 designed for use in machining hemispherical surfaces is shaped to adjust the transformer 102 in accordance with the secant of the angle "A" previously referred to in relation to FIG. 7. For machining surfaces of revolution which deviate markedly from a hemispherical surface, the cam 120 may be replaced by a special cam shaped in accordance with the shape of the surface to be machined to provide an adjustment of the transformer 102 in accordance with the angular position of the cutting tool and the shape of the workpiece which will maintain a constant cutting speed. By providing a set of interchangeable cams corresponding to the most common shapes of surfaces of revolution to be machined, the operator is enabled to set up the machine to perform efficiently in machining surfaces of revolution of different shape. Special cams may be provided as desired.

As indicated diagrammatically in FIG. 8, a power supply for the control circuits is provided by a transformer 122 having an output coil 124 connected to the input of the transformer 102. The three transformers 102, 104, and 106 are connected in cascade as described.

The output of the last transformer 106 in the series is connected through a normally closed switch 126 to a rectifier circuit 128 which has a direct current output connected through leads 130, 132 to the input 94 of the work spindle speed control 90. A normally closed switch 134 is in series with the lead 130.

The control circuit 100 controls the electrical signal which it supplies to the tool spindle drive control 92 in accordance with the factors which determine the tool spindle speed necessary to maintain a uniform width of cut. As previously explained, these factors include the desired width of feed "F" per revolution, a diametrical dimension "D" of the workpiece, the cutting speed "S" of the machine tool, the angular position "A" of the cutting tool, and compensation where necessary for deviation from a hemisphere of the surface being machined.

As shown in FIG. 8, the circuit 100 includes three mechanically adjustable components 136, 138, 140, having variable effective values determined by the adjustment of the components and incorporated into the circuit 100 in a manner such that its output as applied to the control 92 is determined in accordance with the instantaneous effective values of the adjustable components. Preferably, the adjustable components 136, 138, 140 are formed by adjustable transformers similar to those used in the circuit 98.

The input of the transformer 136 is connected directly to the output of the last transformer 106 in the circuit 98 so that the power supply to the transformer 136 is a function of the instantaneous work spindle speed "$a$" of the machine tool. The transformer 136 is adjusted by a manual control 142 in accordance with the desired width of cut "F" to be made by the tool 44 in the machining operation to be performed.

The output of the transformer 136 is connected to the input of the transformer 138 which is adjusted by a manual control 144 in accordance with the diametrical dimension "D" of the workpiece.

The two transformers 136, 138 are mounted in the console 112 and the controls 142 and 144 are positioned on the instrument panel 114.

The output of the transformer 138 is connected to the input of the transformer 140 which provides compensation for the deviation from a hemispherical surface of the shape of the surface to be machined. The transformer 140 itself is adjusted by means of a cam 144, FIGS. 8, 12, and 13, shaped in accordance with the shape of the surface to be machined and operated, as will presently appear, by a mechanical feedback from the tool spindle 32.

As will presently appear, the output of the transformer 140 is further modulated in accordance with two different classes of deviation from a hemispherical surface of the shapes of surfaces to be machined. In broad outline, one class of such deviation comprises "sharp" surfaces which are elongated along the rotary axes of the workpieces. Put another way, a "sharp" surface is a surface of such character that the radial spacing of the cutting tool 44 from the tool spindle axis 35 increases as the cutting tool swings toward the axis of revolution of the workpiece. The other class of deviating surfaces may be characterized as "flat" in that they are shortened along the axes of the surfaces; that is, the cutting tool 44 moves toward the tool spindle axis 35 as it swings toward the rotary axis of the workpiece.

It will be evident from formulas previously discussed that the instantaneous tool spindle speed necessary to provide and maintain a desired width of tool feed is a function of the work spindle speed (supplied to the circuit 100 by the voltage from the transformer 106), the desired width of tool feed (introduced into the circuit 100 by setting the transformer 136), the base diameter of the workpiece (introduced into the circuit by adjustment of the transformer 138), and compensation where necessary for the particular form of the surface to be machined (provided by the transformer 140).

The compensating transformer 140 is actually used in the circuit 100 only when it is desirable to make use of its function in compensating for deviation from a hemispherical surface of the surface being machined. In such instances, the output of the transformer 140 is connected through a switch 146 with a selector switch 148. The selector switch 148 is used to direct the output of the transformer 140 to the primary coil 154 of an isolation transformer 156 either directly or through a step up transformer 150, depending on whether a "sharp" or "flat" surface is being machined.

If the compensating action of the transformer 140 is not needed, the switch 146 is opened and a switch 152 ganged with the switch 146 is closed to connect the output of the transformer 138 directly to the primary coil 154 of the isolation transformer 156.

The output side of the isolation transformer 156 is rectified by a circuit 158 and connected through conductors 160, 162 to the input 96 of the tool spindle motor control 92. A normally closed switch 164 is connected in series with the conductor 160, as shown.

The mechanical feedback drives for operating the control cams 120 and 144 which adjust the transformers 102 and 140 in accordance with the rotary position of the tool spindle 32 are shown in FIGS. 12 and 13. In a normal machining operation, as for example in the machining of a hemisphere, the tool spindle 32 turns through a 90 degree working angle. This critical quarter turn of tool spindle movement is transmitted through a speed increasing transmission 166 to rotate the cams 120, 144 through an angle of 180° as the spindle rotates through its critical 90° range of movement. The increased angular displacement of the cams relative to the rotary movement of the tool spindle 32 extends the radial angle of the effective cam surfaces on the cams to the end that manufacturing of the cams is made easier and operational accuracy is improved.

The two cams 120, 144 are engaged respectively by two pivotal cam followers 168, 170. Swinging movements of the followers 168, 170 are transmitted through two independent speed increasing gear trains 172, 174 to two rotary driven elements 176, 178, FIG. 13, which are connected to adjust the respective transformers 102 and 140. These transformers are mounted adjacent the cams 120, 144 and the gear trains 172, 174 in the housing 180 supported on the end of the tool spindle slide 34 opposite from the work spindle, as shown in FIG. 2.

Re-examining the previously discussed equations which determine the work spindle speed necessary for maintaining a uniform cutting speed, it will be observed that the secant of the angle "A" to which the work spindle speed is proportional approaches infinity as the angle "A" approaches 90°. Obviously, the speed of the work spindle cannot be increased to infinity.

Accordingly, provision is made for limiting the speed range of the work spindle 22 within the speed range capacity of the variable speed drive which powers the work spindle. For this purpose the speed of the work spindle as controlled by the output voltage of the circuit 98 applied to the control 90 is varied proportionately to the secant of the angle "A" (in the machining of a hemispherical surface) until the secant reaches the value of 5 which corresponds to an angle "A" of approximately 78.5 degrees.

Thus, the variable transformer 102 in the circuit 98 provides for controlling the work spindle speed through a speed range of 1 to 5. Accordingly, the rise in the cam surface on the cam 120, which controls the transformer 102, is limited to a radial angle of approximately 157 degrees from its starting position, the angular movement of the cam 120 being twice that of the tool spindle 32. As the angle "A" of the tool spindle 32 increases beyond 78.5 degrees the cam follower 168 rides on an extended circular portion of the cam 120 without changing its position.

In the instant machine 20 the variable transformer 104 is adjustable by the manual control 108 to vary its effective control value through a range of 1 to 5, and hence serves to condition the machine to produce cutting speeds varying through a corresponding range of 1 to 5. Similarly, the transformer 106 controlled by the manual control 110 is adjustable through an effective range of 1 to 5 to accommodate the machine to work pieces varying in diameter through a range of 1 to 5. Consequently, the three transformers 102, 104, and 106, connected in cascade, provide for controlling the speed of the work spindle 22 through a speed range of 1 to 125.

It will be understood that this limitation on the work spindle speed to a speed range of 1 to 125 is obtained by arbitrarily limiting each of the three adjustable transformers in the circuit 98 to an adjustable range of 1 to 5. The limitations on the range of adjustment of the spindle speed are imposed not by limitations inherent in the machine tool control system provided, but by practical limitations on the effective speed range of the variable speed electric motors 80 and 84 used to drive the work and tool spindles.

The over-all variations of the work spindle speed, as determined by the output voltage of the circuit 98, are carried over to the circuit 100 to provide a corresponding range of adjustment of the tool spindle speed. Moreover, the over-all range of speed variations applicable to the work spindle speed is further multiplied in the circuit 100 by adjustment of the variable transformers 136 and 138 to adjust the machine to produce the desired width of cut per revolution on work pieces of different diameters. An over-all range of speed adjustment of only 1 to 4 provided in the circuit 100, when superimposed upon the work spindle speed range of 1 to 125, would produce a range of tool spindle speeds varying from 1 to 500.

The full range of possible tool spindle speeds is multiplied in relation to the speed range of the motor 84 by the use of change speed gears (not shown) in the transmission 86 between the motor 84 and the tool spindle 32 as previously referred to in the description. For any one set of gears used in the transmission 86, the motor speed control 92 which responds to the output voltage of the circuit 100 controls the speed of the spindle 32 within a speed range corresponding to the set of gears employed. The change speed gears used in the tool spindle transmission 86 for a particular machining operation are selected in accordance with the diametrical size of the workpiece and the width of cut to be made. It will be noted with reference to FIG. 9 that the indicator dials 193, 195 on the instrument panel 114 which coact with the width of cut control 142 and with the workpiece diameter control 143 for the circuit are provided respectively with multiple indicator scales 197, 199 corresponding to the various change speed gears used in the tool spindle transmission 86.

However, the control circuits 98, 100 provide, as described, for varying the speed of the work spindle motor 80 through a range of 1 to 125 and the speed of the tool spindle motor 84 through a range of 1 to 500, speed ranges which exceed the practical limitations of the motors used. However, provision is made for maintaining the speeds of both motors within practical limits.

Figures 10, 11:
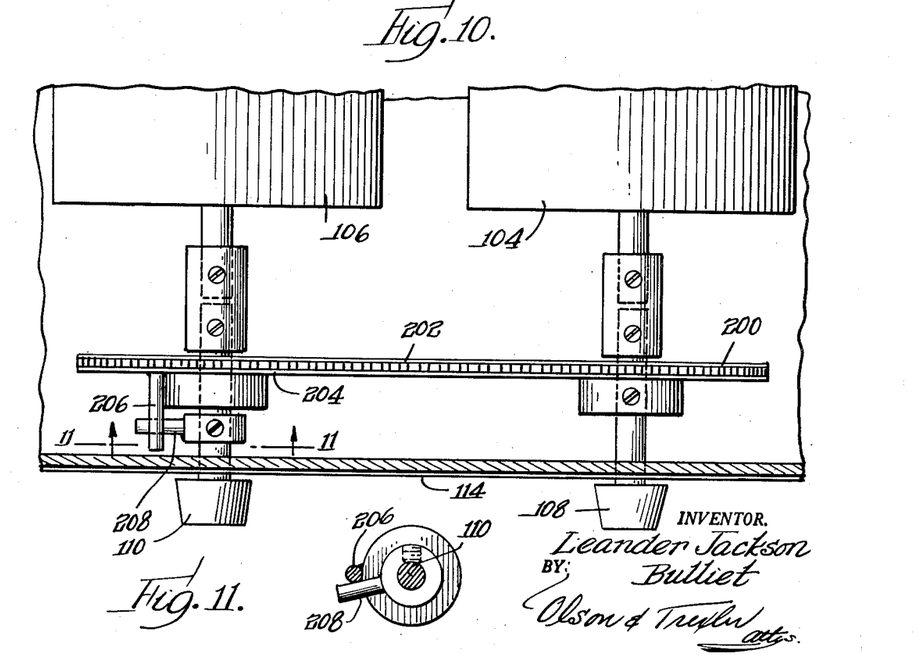
FIG. 10 is a fragmentary sectional view on an enlarged scale, taken along the line 10—10 of FIG. 9.
FIG. 11 is a detail sectional view taken along the line 11—11 of FIG. 10.

For this purpose the machine 20 is equipped with interlock means which precludes setting of the controls to produce output voltages from the circuit 98 corresponding to work spindle motor speeds which are below the practical operating speed range of the variable speed motor 80. As shown in FIGS. 10 and 11, a mechanical interlock is provided between the manual control 108 for setting the variable transformer 104 in accordance with the desired cutting speed and the manual control 110 for setting the variable transformer 106 in accordance with the diameter of the workpiece. In the illustrated construction a pulley wheel 200 is mounted for rotation by the control 108 and connected by a non-slip endless belt or chain 202 with a similar pulley 204 journalled on the control 110. An axially extending lug 206 on the driven pulley 204 projects into interfering relation with a radially extending lug 208 fixed on the control 110, which is rotated to adjust the variable transformer 106. Setting of the control 110 in accordance with the diameter of the workpiece causes the lug 208 to operate in conjunction with the projection 206 to prevent setting of the cutting speed control 108 to a cutting speed value which would result in a speed of the work spindle motor 80 below its operating range. The limitation thus imposed on the minimum cutting speed will arise most frequently in the machining of large diameter workpieces.

When workpieces of small diameter are machined, setting of the control 108 to produce rather high cutting speeds may cause the work spindle motor 80 to reach its maximum operating speed before the tool spindle 32 has turned through 78.5 degrees and before the secant of the angle "A" has reached 5. Overspeeding of the tool spindle motor 80 is prevented by electrical means incorporated into the control circuit 98 and providing for the maximum cutting efficiency obtainable from the motors used.

For this purpose, a voltage responsive relay solenoid 210 is connected to the output side of the variable transformer 106 in the circuit 98, as shown in FIG. 8, to operate when the voltage at the output side of this transformer reaches a value corresponding to the maximum speed capacity of the work spindle motor 80. As the speed of the work spindle motor 80 reaches a predetermined maximum speed, the relay solenoid 210 operates to open the normally closed switch 126 in the circuit 98, to disconnect the output of the transformer 106 from the rectifying circuit 128, and at the same time closes a switch 212 to connect the input of the rectifying circuit 128 and the input to the circuit 100 to the output of a preadjusted transformer 214 energized by the power transformer 122. The transformer 214 supplies a predetermined control voltage to the rectifying circuit 128 and to the circuit 100 which will continue operation of the motor 80 at its maximum rate while the circuit 100 continues to properly coordinate the tool spindle speed with the work spindle speed.

Provision is made for manually controlling the speeds of the work spindle 22 and the tool spindle 32, if desired. For this purpose, an isolation transformer 216, FIG. 8, is energized by the power transformer 122 and connected through a rectifying circuit 218 to provide direct current power through two leads 220, 222. As shown, the lead 222 is connected to one side of each of the motor control inputs 94, 96. Two adjustable voltage dividers 224 and 226 are connected between the direct current power leads 220, 222 in series, respectively, with two trimming rheostats 228, 230.

An output lead 232 from the adjustable voltage divider 224 is connected through a normally open switch 234 with the conductor 130 leading to the input 94 of the motor control 90. The switch 234 is ganged with the switch 134, as shown. Similarly, an output terminal 236 of the adjustable voltage divider 226 is connected through a normally open switch 238 with the conductor 164 leading to the input 96 of the motor control 92. The switch 238 is ganged with the normally closed switch 164 previously mentioned.

To shift from automatic control to manual control of the work and tool spindles, the switches 134, 234, 164 and 238 are operated in unison to open the switches 134, and 164 to disconnect the automatic control circuits 98, 100 and close the switches 234 and 238 to make the manually controlled voltage dividers 224, 226 effective for controlling the voltages to the motor control inputs 94, 96.

The manual controls for the machine tool are mounted on the instrument panel 114 of the console 112. As shown in FIG. 9, all four of the switches 134, 234, 164 and 238 used in switching between automatic and manual control of the controls 90 and 92 are operated by a single manual control 240 on the instrument panel 114. The voltage divider 224 for manually controlling the speed of the work spindle motor 80 is operated by a manual control 242 on the instrument panel 114. Similarly, the voltage divider 226 for controlling the tool spindle motor 84 is operated by a manual control 244 on the panel 114. The ganged switches 146 and 152 and the selector switch 148 used in the control circuit 100 in conjunction with the transformers 140 and 150, as described, are all operated by a common three position control 246 on the instrument panel 114.

Other controls and instruments mounted on the panel 114 and used in the control of the machine are identified by suitable legends in FIG. 9.

It will be appreciated that the invention is not limited to the particular embodiment illustrated but includes variants and alternatives within the scope of the invention as defined by the claims.

3,040,607

The invention is claimed as follows:

1. A machine tool comprising, in combination, a work support spindle, a continuously variable speed motor connected to drive said spindle, a tool support spindle generally perpendicular to said work support spindle, a continuously variable speed motor connected to drive said tool spindle, tool support means on said tool spindle, means for varying the position of said tool support means radially with respect to the axis of said tool support spindle, a first electrical control circuit having an output end coupled to control the speed of said work spindle motor, said circuit including electrical control elements adjustable to vary the effective electrical values of the elements and incorpoarted into the circuit to control the output thereof in accordance with the instantaneous effective values of the control elements, means for adjusting the effective value of one of said control elements in accordance with the diameter of a workpiece, means for adjusting another of said control elements in accordance with a desired cutting speed, means operated by said tool spindle for adjusting another of said control elements in accordance with the rotary position of the tool spindle, a second electrical control circuit having an output end connected to control the speed of said tool spindle motor, means coupling the output of said first circuit to the input of said second circuit to control the output of said second circuit in accordance with the output of the first circuit, said second circuit including electrical control elements adjustable to vary the effective electrical values thereof and incorporated into the second circuit to vary the output thereof in accordance with the instantaneous adjustment of the last mentioned elements, means for adjusting one of said second circuit control elements in accordance with the diameter of a workpiece, means for adjusting another of said second circuit control elements in accordance with a desired degree of tool feeding, and means operated by said tool spindle for adjusting another control element of said second circuit to compensate for changes in the form of a workpiece in accordance with the rotary position of the tool spindle.

2. A machine tool for machining surfaces of revolution varying in diameter along the axes thereof, comprising, in combination, a work spindle, a continuously variable speed drive connected to rotate said spindle, a tool spindle, a continuously variable speed drive for rotating said tool spindle, said work spindle drive and said tool spindle drive having variable speed output ends which are independent of each other, a first electrical control circuit for controlling the speed of said work spindle drive to maintain a uniform cutting speed, said first control circuit including three control components adjustable to vary the effective values of the components and connected into the control circuit in a manner which varies the speed controlling action thereof, means for adjusting one of said control elements in accordance with a desired cutting speed, means for adjusting another of said control elements in accordance with a diametrical workpiece dimension, means operated in synchronization with rotary movement of said tool spindle for adjusting another of said control elements to control said circuit in accordance with the rotary position of the tool spindle, a second electrical control circuit for controlling said tool spindle drive to maintain a constant width of cut throughout the machining of a workpiece, means coupling said first control circuit to said second control circuit to control the latter in accordance with the speed of said work spindle, said second control circuit including two control components adjustable to vary the effective values thereof and connected into the second control circuit to control the speed controlling action thereof, means for adjusting one of said second circuit control components in accordance with the degree of tool feed desired, and means for adjusting another of said second circuit control components in accordance with a dimension of a workpiece.

3. In a machine tool the combination of a work spindle, a variable speed drive for rotating said work spindle, a tool spindle, a variable speed drive for rotating said tool spindle, first electrical control circuit means for controlling the speed of said work spindle drive, said first circuit means including adjustable transformers for controlling the operation of said first circuit means, means for adjusting one of said transformers in accordance with a predetermined cutting speed, means operated in synchronization with movement of said tool spindle and connected to adjust another of said transformers in accordance with the instantaneous rotary position of said tool spindle, a second electrical control circuit means for controlling the speed of said tool spindle drive, said second circuit means including adjustable transformers for controlling the operation of said second circuit means, means for controlling said second circuit means in accordance with the rotary speed of said work spindle, means for adjusting one of said second circuit means transformers in accordance with a desired rate of tool feed, means for adjusting another of said second circuit means transformers in accordance with the instantaneous position of the tool spindle, a compensating transformer, and means for seletcively coupling said compensating transformer to said second circuit means to modify the operation thereof in accordance with the shape of the surface to be machined.

4. In a machine tool for machining a rotary surface of revolution, comprising, in combination, a work spindle, a variable speed drive connected to rotate said spindle, a tool spindle, a variable speed drive connected to rotate said tool spindle, means for supporting a tool on said tood spindle, first electrical circuit means for controlling said work spindle drive to maintain a generally uniform cutting speed as said tool spindle rotates a tool in relation to a rotating work piece, said first circuit including electrical components adjustable to vary the effective electrical values thereof, means for adjusting a first one of said components in accordance with a desired cutting speed, means for adjusting a second one of said components in accordance with a workpiece dimension, interlock means interconnected between said second component adjusting means and said first component adjusting means to limit adjustment of the two in relation to each other, means operated by said tool spindle and connected to adjust a third one of said components in accordance with the instantaneous rotary position of the tool spindle, second circuit means for controlling said tool spindle drive to maintain a uniform width of feeding of a tool carried by said tool spindle, means coupling the said first control circuit to said second control circuit to control the latter in accordance with the speed of said work spindle, and means for adjusting said second control circuit to control the output thereof in accordance wtih a predetermined width of cut to be made.

5. In a machine tool for machining a rotary surface of revolution by polar coordinate movements of a cutting tool relative to a rotating workpiece, comprising, in combination, a work spindle, a variable speed drive connected to rotate said spindle, a tool spindle, a variable speed drive connected to rotate said tool spindle, means for supporting a tool on said tool spindle in radially spaced relation to the axis thereof, first electrical circuit means for controlling said work spindle drive to maintain a generally uniform cutting speed as said tool spindle rotates a tool in relation to a rotating workpiece, speed control means connecting the output of said circuit to control said work spindle drive, three electrical components adjustable to vary the effective electrical values thereof and incorporated into said first circuit to vary the output in accordance with the adjustment of each component, means for adjusting a first one of said components in accordance with a desired cutting speed, means for adjusting a second one of said components in accordance with a dimension of a workpiece, interlock means interconnected between said second component adjusting means and said first component adjusting means to limit the maximum cutting speed adjustment of the latter in accordance with the setting of said first component adjusting means, mechanical feed-back means operated in synchronism with rotation of said tool spindle and connected to adjust a third one of said components to vary the speed of said work spindle in accordance with the angular position of said tool spindle, second electrical circuit means for controlling said tool spindle drive to maintain a uniform width of feeding a cutting tool carried by said tool spindle, speed control means connecting the output of said second circuit to control said tool spindle drive, means coupling said first control circuit to said second control circuit to control the latter in accordance with the speed of said work spindle, means for adjustably presetting said second control circuit to control the output thereof in accordance with a predetermined width of cut to be made, means in said second control circuit for adjusting the output thereof in accordance with a dimension of a workpiece, and means operated in synchronism with said tool spindle and coacting with said second control circuit to adjust the output thereof in accordance with the angular position of said tool spindle.

6. A machine tool for machining a surface of revolution by polar coordinate motions of a tool relative to a rotating workpiece, comprising, in combination, a rotary work support spindle, a continuously variable speed drive connected to rotate said work spindle, a tool support spindle, tool support means on said tool spindle, means for varying the position of said tool support means radially with respect to the axis of the tool spindle, a continuously variable speed drive connected to rotate said tool spindle, said work spindle drive and said tool spindle drive having output ends rotatable independently of each other, a first electrical control circuit for controlling the speed of said work spindle drive, electrical control means incorporated into said first circuit and operated in synchronism with rotation of said tool spindle to control the speed of said work spindle in accordance with the rotary position of said tool spindle, a second electrical control circuit for controlling said tool spindle drive, electrical control means in said second circuit operated in synchronism with rotation of said tool spindle to control the speed of said tool spindle in accordance with the rotary position thereof, control means incorporated electrically into both said control circuits to control the rotary speed of said respective spindles in accordance with a desired tool speed, control means incorporated electrically into both said circuits to control the speed of said respective spindles in accordance wth a diametrical dimension of a workpiece, and control means incorporated electrically into said second control circuit to control the speed thereof in accordance with a desired degree of tool feed.

7. A machine tool for machining a surface of revolution by polar coordinate motions of a cutting tool relative to a workpiece, comprising, in combination, a work support spindle, a continuously variable speed drive connected to rotate said spindle, electrical speed control means for said drive, a tool support spindle generally perpendicular to said work support spindle, a continuously variable speed drive connected to rotate said tool spindle, said work spindle drive and said tool spindle drive having variable speed output ends which are independent of each other, a first electrical control circuit for controlling the speed of said work spindle in accordance with the position of said tool spindle to provide and maintain a desired cutting speed throughout the major portion of the effective range of rotary movement of the tool spindle in machining a workpiece, means for controlling said work spindle drive in accordance with the output of said first control circuit, said first control circuit including three control components adjustable to vary the effective value of the components and integrated into the control circuit in a manner which varies the output thereof in accordance with the instantaneous adjustment of the control elements, means for adjusting one of said control components in accordance with a desired cutting speed, means for adjusting another of said control components in accordance with a workpiece dimension, means operated as an incident to rotation of said tool spindle for adjusting another of said control components in accordance with the rotary position of the tool spindle, a second electrical control circuit for controlling the speed of said tool spindle to maintain a constant width of cut throughout the machining of a workpiece, means for controlling said tool spindle drive in accordance with the output of said second control circuit, means connecting the output of said first control circuit to the input of said second control circuit to control the output of the latter in accordance with the output of the first conrol circuit, said second control circuit including three electrical control components adjustable to vary the effective values thereof and integrated into the second control circuit to control the output thereof, means for adjusting one of said second circuit control components in accordance with the degree of tool feed desired, means for adjusting another of said second circuit control components in accordance with a dimension of a workpiece to be machined, and means operated as an incident to rotation of said tool spindle for adjusting another of said second circuit control components in accordance with the instantaneous rotary position of said tool spindle to compensate for changes in the shape of the surface being machined.

8. A machine tool for machining a surface of revolution by polar coordinate movements of a cutting tool relative to a rotating workpiece, comprising, in combination, a work spindle, a variable speed drive connected to rotate said work spindle, a tool spindle mounted at an angle relative to said work spindle, means on said tool spindle for supporting a tool in radially spaced relation to the axis of said tool spindle, a variable speed drive connected to rotate said tool spindle, said work spindle drive and said tool spindle drive having output ends independent of each other, means for controlling said work spindle drive and said tool spindle drive in accordance with a predetermined reference speed, means for controlling said tool spindle drive in accordance with a predetermined desired degree of cut, and means operated in synchronism with said tool spindle to control said work spindle drive and said tool spindle drive in accordance with the rotary position of said tool spindle to maintain a generally unvarying cutting tool speed and a generally unvarying width of cut by a tool supported by said tool supporting means.

9. In a machine tool for machining a surface of revolution on a rotating workpiece, the combination of a work spindle, a variable speed drive for rotating said work spindle, a tool spindle, a variable speed drive for rotating said tool spindle, a first control circuit, means for varying the speed of said work spindle drive in accordance with the output of said first control circuit, means for adjusting said circuit to control the output thereof in accordance with a desired cutting speed, means for continuously adjusting said first circuit to control the output thereof in accordance with the instantaneous position of said tool spindle, means for limiting the effective output of said first circuit to an electrical value corresponding to a predetermined maximum speed of said work spindle drive, a second control circuit coupled to said first control circuit, means for controlling the speed of said tool spindle drive in accordance with the ouput of said second circuit, and means for adjusting said second circuit to control the output thereof in accordance with a predetermining desired degree of tool feed.

10. In a machine tool for machining surfaces of revolution varying in diameter along the axes thereof, the combination of a work spindle, a variable speed drive connected to rotate said work spindle, a tool spindle, a variable speed drive connected to rotate said tool spindle, a first electrical control circuit coupled to control the speed of said work spindle drive and including a plurality of variable components adjustable to vary the speed controlling action of the circuit, means for adjusting one of said components in accordance with a desired cutting speed, a second electrical control circuit coupled to control said tool spindle drive and including a plurality of variable components adjustable to vary the speed controlling action of said second circuit, means for adjusting one of said second circuit components in accordance with a desired degree of tool feed, a pair of rotary cams, motion multiplying transmission means connected between said tool spindle and said cams to transmit rotary motion of said tool spindle to said cams, motion multiplying cam follower means operated by one of said cams and connected to adjust another of said variable components in said first circuit to effect control of said work spindle drive in accordance with the instantaneous rotary position of said tool spindle, and motion increasing cam follower means operated by the other one of said cams and connected to adjust another of said variable components in said second control circuit to effect control of said tool spindle drive in accordance with the instantaneous rotary position of said tool spindle.

11. In a machine tool for machining rotary surfaces of revolution which vary in diameter along the axes thereof, comprising, in combination, a rotary work support, a variable speed drive connected to rotate said work support, a movable tool support, a variable speed drive connected to move said tool support, first control means for controlling said work support drive to maintain a uniform cutting speed, said first control means including first adjusting means incorporated thereinto to control said first control means in accordance with a desired cutting speed, said first control means including second adjusting means incorporated thereinto for controlling the first control means, feed-back means operated in synchronization with said movable tool support and connected to adjust said second adjusting means in accordance with the instantaneous position of said movable tool support to vary the speed of said work support drive to maintain a uniform cutting speed, second control means connected to control the speed of said tool support drive, means for adjusting said second control means to control the speed of said tool support drive to provide a desired width of cut, and means for continuously adjusting said second control means in accordance with the speed of said work support drive to vary the speed of said tool support drive to maintain a uniform width of cut.

12. In a machine tool for machining surfaces of revolution by polar coordinate movements of a cutting tool relative to a rotating work piece, the combination of a work spindle, a variable speed drive for rotating said work spindle, a tool spindle, means for supporting a tool on said tool spindle in radially spaced relation to the axis thereof, a variable speed drive connected to rotate said tool spindle, a first electrical control circuit, means for controlling the speed of said work spindle drive in accordance with the output of said first circuit, said first circuit including three adjustable transformers connected in cascade, means for adjusting one of said transformers in accordance with a workpiece dimension, means for adjusting another of said transformers in accordance with a predetermined cutting speed, mechanical feed-back means operated in synchronization with movement of said tool spindle and connected to adjust another of said transformers in accordance with the instantaneous rotary position of said tool spindle, a second electrical control circuit, means for controlling the speed of said tool spindle drive in accordance with the output of said second circuit including three adjustable transformers connected in cascade, means coupling the output of said first circuit to the input of said second circuit to vary the output of the latter, means for adjusting one of said second circuit transformers in accordance with a workpiece dimension, means for adjusting another of said second circuit transformers in accordance with a desired rate of tool feed, feed-back means operated in synchronism with rotary movement of said tool spindle and connected to adjust another of said second circuit transformers in accordance with the instantaneous position of the tool spindle, said last mentioned feed-back means including a compensating element adapted to modify in accordance with the shape of a surface to be machined the adjustment of said last mentioned transformer relative to the position of said tool spindle, a compensating transformer, and means for selectively connecting said compensating transformer in series with the output of said second circuit in accordance with the shape of the surface to be machined.

13. A machine tool adapted to maintain a uniform machining rate while machining surfaces of revolution varying in diameter along the axes thereof, comprising, in combination, a work rotating element, a first variable speed drive for said work rotating element, a movable tool support, a second variable speed drive for moving said tool support, a first electrical control circuit, means for controlling said first drive in accordance with the output of said first control circuit, said first control circuit including adjustable components therein for varying the output thereof, means for adjusting one of said components in accordance with a desired cutting speed, feed-back means operated in synchronism with movement of said movable tool support and connected to operate another of said adjustable components to vary the speed of said first drive in accordance with the position of said tool support, speed limiting means coupled to the output of said first control circuit to respond to an output of the latter corresponding to a predetermined maximum speed of said first drive to effectively control said controlling means for said first drive to limit the speed of said first drive to said maximum speed, a second control circuit, means for varying the speed of said second drive in accordance with the output of said second control circuit, means for controlling said second control circuit in accordance with the control of said first drive controlling means by said first circuit and said speed limiting means, and means for adjusting said second control circuit to control the output thereof in accordance with a desired degree of tool feeding.

14. In a machine tool adapted to maintain a uniform cutting rate while machining a surface of revolution by polar coordinate movements of a cutting tool relative to a rotating work piece, the combination of a work spindle, a variable speed drive for said work spindle, a tool spindle, a variable speed drive for said tool spindle, a first electrical control circuit, means for controlling said work spindle drive in accordance with the output of said first control circuit, means for adjusting said first circuit to control the output thereof in accordance with a desired cutting speed, means for continuously adjusting said first circuit in accordance with the instantaneous position of said tool spindle to control the output of said first circuit in accordance with changing positions of the tool spindle, a second control circuit coupled to said first control circuit, means for controlling said tool spindle drive in accordance with the output of said second circuit, means for adjusting said second circuit in accordance with a desired degree of tool feed, speed limiting means coupled to the output of said first circuit to respond to an electrical output thereof corresponding to a predetermined maximum speed of said work spindle drive to disconnect said first control circuit from said second circuit and from said means for controlling said work spindle drive, and said speed limiting means including means operative as an incident to said disconnection of said first circuit to apply to said second circuit and to said controlling means for said work spindle drive an electrical quantity corresponding to the output of said first circuit for effecting said maximum speed of said work spindle drive.

15. A machine tool comprising, in combination, a work spindle, a continuously variable speed motor connected to drive said spindle, a tool spindle, a continuously variable speed motor connected to drive said tool spindle, a first electrical control circuit coupled to control the speed of said work spindle motor, said circuit including electrical control elements adjustable to vary the effective electrical values thereof, and incorporated into the circuit to control the output thereof, means for adjusting one of said control elements in accordance with a desired cutting speed, means operated in synchronization with movement of said tool spindle for adjusting another of said control elements in accordance with the rotary position of the tool spindle, a second electrical control circuit coupled to control the speed of said tool spindle motor, means coupling said first circuit to said second circuit to control the latter, said second circuit including electrical control elements adjustable to vary the effective electrical values thereof and incorporated into the second circuit to control the output thereof, and means for adjusting one of said second circuit control elements in accordance with a desired degree of tool feeding.

16. In a machine tool for machining surfaces of revolution varying in diameter along the axes thereof, the combination of a work spindle, a variable speed drive connected to rotate said work spindle, a tool spindle, a variable speed drive connected to rotate said tool spindle, a first control circuit coupled to control the speed of said work spindle drive and including a plurality of control components adjustable to vary the speed controlling action of the circuit, means for adjusting one of said components in accordance with a desired cutting speed, a second control circuit coupled to control said tool spindle drive and including a plurality of control components adjustable to vary the speed control action of said second circuit, means for adjusting one of said second circuit components in accordance with a desired degree of tool feed, cam means, transmission means connected between said tool spindle and said cam means to transmit motion of said tool spindle to said cam means, cam follower means operated by said cam means and connected to adjust another of said control components in said first circuit to effect control of said work spindle drive in accordance with the rotary position of said tool spindle, and cam follower means operated by said cam means and connected to adjust another control component in said second control circuit to effect control of said tool spindle drive in accordance with the rotary position of said tool spindle.

References Cited in the file of this patent
UNITED STATES PATENTS

| | | |
|---|---|---|
| 2,600,988 | Greene et al. | June 17, 1952 |
| 2,677,285 | Volk | May 4, 1954 |
| 2,697,373 | Siekmann et al. | Dec. 21, 1954 |
| 2,741,732 | Cunningham | Apr. 10, 1956 |

UNITED STATES PATENT OFFICE
CERTIFICATE OF CORRECTION

Patent No. 3,040,607                                     June 26, 1962

Leander Jackson Bulliet

It is hereby certified that error appears in the above numbered patent requiring correction and that the said Letters Patent should read as corrected below.

Column 3, line 7, for "42" read -- 32 --; column 5, line 65, the formula should appear as shown below instead of as in the patent:

b pi D=Fa column 12, line 14, for "he" read -- the --; column 14, line 23, for "seletcively" read -- selectively --; line 32, for "tood" read -- tool --; column 17, line 70, before "including" insert -- , said second circuit --.

Signed and sealed this 20th day of November 1962.

(SEAL)
Attest:

ERNEST W. SWIDER                                   DAVID L. LADD Attesting Officer                                        Commissioner of Patents